Nov. 19, 1957    A. STANIS    2,813,712
RUBBER BUMPERS
Filed Sept. 30, 1953

INVENTOR.
ALEXANDER STANIS
BY
Wilson and Redrow
ATTORNEYS.

United States Patent Office 2,813,712
Patented Nov. 19, 1957

2,813,712

RUBBER BUMPERS

Alexander Stanis, Detroit, Mich., assignor to Studebaker-Packard Corporation, a corporation of Michigan Application September 30, 1953, Serial No. 383,267

5 Claims. (Cl. 267—63)

This invention relates to elastic bumper members adapted to cushion impacts between adjacent movable structural members. In particular, my invention pertains to a bumper member of rubber or other elastomeric material and attaching means therefor, adapted for use with the suspension system of a motor vehicle, although the invention is by no means to be construed as limited to that particular application, the invention being readily adaptable for similar use in other fields.

According to the bumper member of the present improved design, a number of characteristics are combined in order to give the desired results. Among such characteristics are long service life under conditions of repeated impact, a relatively noiseless cushioning effect, it being one purpose of the present elastic bumper to give quiet operation free from the objectionable noise otherwise manifested by metal to metal contact, a construction permitting rapid mounting and affixation to an apertured support member, and a simple multipart construction with a minimum number of parts, thereby making the assembly of such bumper member and a support member of low cost.

In certain instances, heretofore, difficulty has been encountered in providing an elastic bumper member with satisfactory means for attaching the same to a suspension member. Various methods of affixing the bumpers have been used in the past without attaining the desired quality and effective life of operation. One-piece rubber bumpers failed to provide adequate operative life since the portion designed to retain the bumper to the apertured support cracked or failed in service. Other elastic bumpers adapted for rapid attachment and formed with slots provided to receive spring steel fastening means have proved inadequate owing to the tendency of the metallic fastening means to slip from the slots provided in the bumper during the repeated impacts of operation, thereby producing objectionable rattling and subsequent failure.

It is the object of this present invention to provide an elastic bumper member and fastening means therefor, which will overcome the objectionable features of the bumpers heretofore used. The elastic bumper member and fastening means therefor, forming the subject matter of this invention, is adapted for economical production, rapid attachment to the suspension member and adapted to provide a cushioning member of relatively quiet operation for a long service life. It is a particular object of this invention to provide an elastic bumper in which the elastic quality of the bumper provides not only the cushioning effect on impact, but, in addition, provides the source of retaining force in the attaching means adapted to secure the bumper to an apertured member.

It is an object of the present invention to provide a mounting device for fastening an elastic bumper to a rigid apertured suspension member wherein the fastening operation may be accomplished without the use of special tools or, in fact, any tools except in certain instances where the expedient of a tool may be found particularly desirable.

Another object is to provide, for use with a fastener receiving apertured suspension member, a unitary type elastic bumper unit which is self-contained and self-locked when fastened in place due to the incorporation therein of embedded fasteners which when initially deflected are thereafter self-urged and are self-engaging in the margins of the aperture in the suspension member.

Another object is to provide a mounting device of a snap fastener type such as described in the foregoing paragraph, in which the fasteners are used by twos or more per unit, in which the fasteners are identical to one another according to at least one species of the present invention, and in which they can be readily formed from sheet metal by a simple stamping and/or upsetting operation.

Another object is to provide a hook-carrying mounting fastener for attaching together a bumper and an apertured suspension member and employing a snap-fastener principle whereby sharp edged hooks are used in a manner such that they have reentrant angled engagement with the margins of the aperture in the suspension member.

Other objects of this invention will appear in the following description and appended claims, reference being had to the accompanying drawings forming a part of this specification wherein like reference characters designate corresponding parts in the several views.

Figure 1:
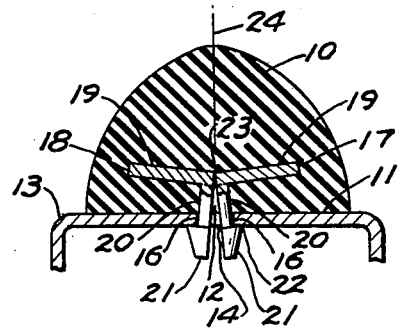
Figure 1 is a sectional view illustrating the attaching means in its partially expanded engaging position.
Figure 2:
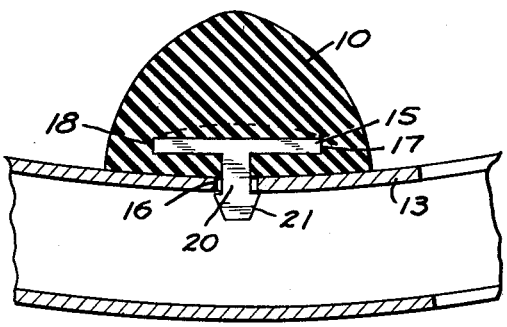
Figure 2 is a partial sectional view showing the bumper mounted on an apertured support member with the attaching means in the closed position.

Referring now to the drawings and more particularly to Figures 1 and 2, a bumper body formed of rubber or other elastic material is indicated at 10. In the form illustrated, the bumper body is of general frusto-conical shape formed with a substantially flat base 11. The frusto-conical body 10 has a flat base 11 and an aperture 12 centrally located and extending a short distance from the base 11 into the interior of the body 10. The flat base 11 of the bumper body 10 sits upon a flat portion of an apertured structural member 13, as shown in Figure 1 and Figure 2. The aperture 12 of the bumper body 10 is coaxial with an aperture 14 of the structural member 13. Embedded within the bumper body 10 and extending outwardly therefrom is the attaching means indicated generally by numeral 15 in Figure 2. A portion of the attaching means 15 extends freely divergingly through the coaxial apertures 12 and 14, respectively, and contacts a portion 16 of the structural member adjacent the aperture 14 thereby holding the bumper body 10 in a fixed position on the structural member 13, as more fully explained hereafter.

The attaching means 15 is metallic and preferably not of spring steel since no spring effect need be created in the attaching means as an isolated member. The attaching means is preferably of two-part structure, 17 and 18, each portion being, preferably, identical in construction, positioned and embedded in the bumper body 10 in cooperative relationship. Each portion of the attaching means comprises a semi-disc base or anchor portion 19, positioned in closely spaced juxtaposition to the plane of the flat base 11, and a stem or leg portion 20 extending from the base 19 and terminating in a frusto-conically shaped, mutually oppositely directed hook portion 21. These parts may conveniently be formed by a sheet metal stamping process. The frusto-conically shaped hook portions 21 may thereafter be formed by upsetting and each of the fastening members, 17 and 18, may be bent along its own length so that the stem portion 20 is angularly related to and about of an equal length to the base or anchor portion 19. As shown, the angular relationship between the portions 19 and 20 is substantially a right angle. The base of the frusto-conically shaped hook portion 21 is of larger diameter than the stem portion 20, the diameter differential constituting a flange portion 22 adapted to contact a portion 16 of the structural member 13 adjacent the aperture 14 and hold the bumper body in fixed position on the structural member.

Figure 3:
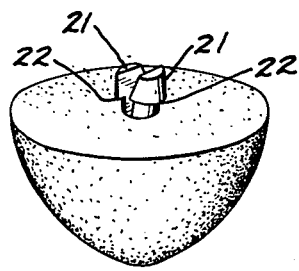
Figure 3 is a perspective view of a bumper embodying the features of this invention and showing the attaching means in the normal full expanded position.

The bumper body 10 is preferably formed by molding. The two portions of the attaching means, 17 and 18, are positioned preferably fulcrumed against one another in co-acting relationship along a line 23 at the bases 19 of the two elements as shown in Figure 1, the line of fulcrum 23 being normal to the longitudinal axis 24 of the frusto-conical body 10. By properly positioning and preferably fulcruming the two elements of the attaching means and then molding the elastic bumper with the attaching means embedded therein and bonded thereto, the leg portions 20 of the attaching means are established in a normal yieldably expanded relationship as shown in Figure 3. The angle formed by the legs 20 in the normal spread-apart position is predeterminately greater than the angle attained by the legs after insertion through an aperture thereby providing for constant retaining pressure by the legs against the edges of the apertured member, as illustrated in Figure 1. As shown in Figure 3, the free full-expanded angle is approximately twenty-five degrees whereas the partially expanded angle, illustrated in Figure 1, is approximately twenty degrees.

Figure 4:
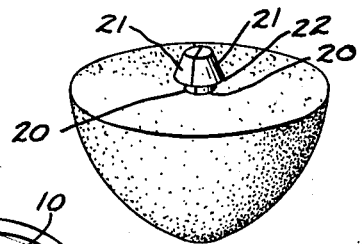
Figure 4 is a perspective view similar to Figure 3 but showing the attaching means of the bumper in the closed position.

In affixing the bumper body 10 to a structural member 13, the leg portions 20 are pressed inwardly permitting insertion of the legs through the aperture 14 as shown in Figures 2 and 4. The elastic quality of the bumper body 10 in which the attaching elements are embedded permits deflection of the base portions 19 when the leg portions are pressed inwardly. The elastic material of the bumper body bonded to the attaching means is then in a stressed condition, the tendency of the elastic body to revert to an equilibrium state or unstressed condition constituting the force that continually urges the legs 20 of the attaching means to the full spread-apart position. After the insertion of the leg portions through the aperture and the release of pressure, the legs of the attaching means tend to assume a full spread-apart position thereby holding the bumper body 10 to the structural member 13.

Figure 6:
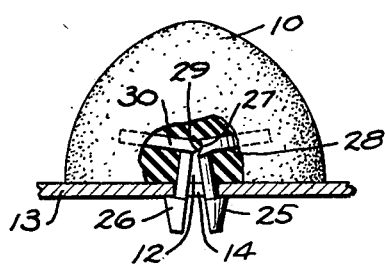
Figure 6 is a sectional view similar to Figure 1 illustrating a modified form of attaching means.
Figure 5:
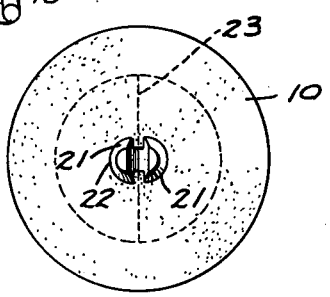
Figure 5 is a bottom plan view of the bumper with the attaching means in the normal full expanded position corresponding to Figure 3.

A somewhat modified form of attaching means is shown in Figure 6. In the modification there illustrated, the two elements of the attaching means, 25 and 26, are not of identical structure. One element of the attaching means 25 is provided with a longitudinal triangularly shaped groove 27 on its inner face adjacent the base portion 28. The other co-acting element 26 of the attaching means is provided with a longitudinal triangular projection 29 on its inner face adjacent the base 30. The triangular projection 29 nests in the groove 27 and facilitates the fulcrum action between the two portions 25 and 26, the fulcrum action being substantially that explained in more detail elsewhere in the specification.

In operation, impacts upon the elastic bumper body 10 will deformably compress that member thereby cushioning the impact. The compressive force transmitted to the bases 19 of the attaching means, preferably fulcrumed against each other along the line 23, will deflect said bases downwardly thereby closing said leg portions. At that moment, the compressive load holds the bumper body to the apertured support member. With the legs forced to the closed position the objectionable noise, which would otherwise be produced by metal to metal contact of the attaching means and the support, is avoided.

By fulcruming each of the elements of the attaching means against one another, a more uniform spread-apart tendency of the legs 20 is produced. In addition, the co-fulcruming relationship of the elements retards any tendency of one element to shift relative to the other, causing subsequent improper functioning.

The construction of the bumper and attaching means herein described, particularly adapts the bumper body for long service life. In the absence of a compressive load the stresses on the bumper body are at a minimum consisting only of those stresses present in the body due to the restraining of the legs of the attaching means in their effort to assume a normal full-expanded position. Upon impact the compressive forces are equalized over the disc-like bases of the attaching means, as a result of the flexible nature of the attaching means produced by embedding the attaching means in the elastic bumper body. This distribution of stresses during impact decreases the probability of shortened service life, an effect of cracks or failures in localized stress areas.

The retaining force manifested by the legs of the attaching means but effectually exerted within the elastic bumper body, substantially minimizes the tendency of the attaching means to rattle, rattling being a particularly undesirable feature when the bumper body is mounted on a frame or suspension member of a motor vehicle. When compared to one-piece spring clip bumper attaching means which are able to work free in the slot of the bumper adapted to receive them and thereby rattle against the apertured member, the present bumper body and attaching means therefor constitutes a definite improvement since the attaching means of the present invention being embedded in the elastic body is unable to move freely relative to the body and thereby rattle.

Any tendency of the elastic bumper body to spread laterally due to the repeated compressive impacts will accentuate the spread-apart tendency of the legs. As can be seen from the drawings, the elastic body upon slight set-spreading will carry the two elements of the attaching means to the spread position thereby emphasizing the expanded position of the leg portions and effectually increasing the retaining force of the attaching means.

From the foregoing description, it will be seen that I have provided an improved rubber bumper and attaching means therefor, which is inexpensive in its construction, capable of rapid assembly upon a structural member, and adapted to give improved performance in operation.

As herein disclosed, the fastening means for the frusto-conical rubber bumper is shown to embed two bent hook fastener members, the plane of each member containing the longitudinal axis of the rubber bumper and being common to the plane of the other fastener member, such that the hooks face in opposite directions from one another. It is evident, however, that three or more hook fastener members may be employed, the plane of each member containing the longitudinal axis of the bumper and arranged such that the respective hooks of the members radiate outwardly. So, also, the drawing shows a rigid support member which is movable relatively to another member in a suspension system and which is centrally apertured to receive outwardly expanding type leg fasteners for supporting a bumper but, self-evidently, a pair of aperture means may be provided in one of the relatively movable suspension members, each of which is adapted to receive a laterally inwardly urged leg fastener, both leg fasteners yieldably urged toward one another and having hooks extending in the direction of one another. The leg and anchor portions of the fastener members are disposed at right angles to one another and are shown to be of about the same linear length but, indeed, it is not essential to the present invention that a right angle be strictly adhered to and an acute or an obtuse angular relationship may be employed and, indeed, it may be found advantageous to have the leg portions considerably longer than the anchor portions or vice versa.

Figure 7:
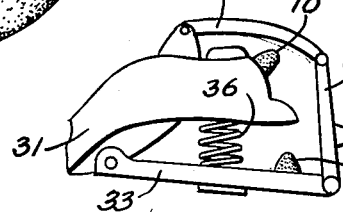
Fig. 7 is a front elevation of a suspension system embodying the present invention.

The bumpers 10 can be used in any well known suspension system. Figure 7 shows the rubber bumpers 10 located in a conventional front suspension of an automobile. In that figure, the frame cross member is shown at 31 with the upper and lower support arms 32 and 33 swingably connected thereto. The upper and lower support arms 32 and 33 are pivotally connected to the upper and lower ends of the king pin 34. A spindle 35 to carry a wheel is located on the king pin 34. A spring 36 is placed between the lower support arm 33 and the frame 31 which resiliently resists relative motion between these two elements.

In Figure 7 two rubber bumpers 10 are located on the frame member 31 and the lower support arm 33. These bumpers 10 provide cushioning limits to the displacement of arms 32 and 33, carrying spindle 35 and the wheel. The bumper 10 which is located on the frame 31 absorbs the shock to the suspension system when the arm 32, together with the spindle and wheel are deflected to the lowermost position. When the suspension is deflected upwardly the rubber bumper 10 located on the lower support arm 33 bears against the frame 31 to cushion this impact.

By the term "rubber" in the specification and claims is meant any suitable elastomeric material, for instance, elastic plastic, synthetic rubber, natural or synthetic resins, neoprene, duprene and any combination of two or more of the same.

Variations within the spirit and scope of the invention described are equally comprehended by the foregoing description.

What is claimed is:

1. Means for attaching an elastic body to an apertured support comprising two separate generally L-shaped elements, each of said elements comprising a base portion and a leg portion terminating in a hooked end portion, said L-shaped elements adapted to be partially embedded in the elastic body in substantially back-to-back cooperative relation with the leg portions of said elements extending from said elastic body in a predetermined angular relation with respect to each other, said leg portions resistibly responsive to closing pressure due to the elastic quality of said embedding material whereby said leg portions may be inserted through an aperture of a support, said leg portions upon insertion and release of pressure expandably forcibly engaging the edges of said support adjacent the aperture thereby holding the elastic body to the apertured support, said engaging force produced by the restorative quality of the elastic body during said leg portions to the fully expanded angular relation.

2. The combination of a bumper body and means for attaching the body to an apertured support comprising a body of elastic deformable material of a frusto-conical shape with a flat base, and attaching means consisting of two separate generally L-shaped elements partially embedded within said elastic body, each of said elements comprising a transversely extending base portion wholly embedded within said body and leg portions extending outwardly from said body through the flat base portion of the body, said leg portions terminating in hooked end portions, each of said elements embedded within said elastic body in back-to-back cooperative relationship with each leg portion of said elements extending outwardly at a predetermined angular relation with respect to the other leg portion, said leg portions resistibly responsive to closing pressure due to the elastic property of the embedding body for insertion of the leg portions in an aperture, said leg portions expanding upon release of pressure thereby forcibly engaging the edges of the support member adjacent the aperture and securely retaining the bumper body in fixed position on said aperture.

3. In combination, a rigid member relatively movable with respect to another member in a suspension and arranged to support a suspension bumper and provided with aperture means therein, a restorably yieldable suspension bumper of generally symmetrical conical shape with respect to the longitudinal axis thereof, and having a flat base seated on said member so as to overlie the said aperture means, said flat base being arranged cross-wise to the longitudinal axis aforesaid and having a central tapered recess extending coaxially inwardly from the base into the interior of the bumper, and discrete fastener elements having anchor portions embedded in the bumper and hook-carrying leg portions angularly related to the anchor portions and emerging freely divergingly from the recess and extending through the aperture means in the rigid member, said elements being tiltably springable toward and away from a central reference line coincident with said longitudinal axis, and each element having a surface at the junction between its leg and anchor portions engageable with a complementary surface on another said element so as to fulcrum thereagainst under action of the restorative quality of the bumper and cause the hook on each leg to engage an edge of the aperture means.

4. In combination, a rigid suspension member swingable with respect to a stationary member in a suspension and arranged to support a rubber bumper and provided with an aperture therein, an elastic frustoconical suspension bumper having an interior matrix of yieldable rubber, said bumper further having a longitudinal axis and a flat base normal thereto seated on said rigid swingable member so as to cover the aperture therein, said flat base having a central inwardly tapering recess extending into the interior of the rubber bumper and coaxially registering with said aperture, and a pair of discrete adjacent fastener elements having anchor portions embedded in the rubber matrix of the bumper in closely spaced juxtaposition to the plane of the base of the bumper and hook-carrying leg portions at right angles to the anchor portions and emerging freely divergingly from the recess and extending through the coaxial aperture in the rigid swingable member, the hooks on each of said fastener elements extending away from one another and the leg portions thereof being tiltably springable toward one another from a relaxed relatively divergent position, each said element having a surface formed adjacent the junction between its leg and anchor portions engageable with a complementary surface on the other element so as to fulcrum thereagainst under action of the restorative quality of the rubber matrix and cause the hook on each leg to engage an edge of the aperture means opposite to the edge engaged by the other hook.

5. In combination, a rigid suspension member swingable with respect to a stationary member in a suspension and arranged to support a rubber bumper and provided with an aperture therein, an elastic frusto-conical suspension bumper having an interior matrix of yieldable rubber, said bumper further having a longitudinal axis and a flat base normal thereto seated on said rigid swingable member so as to cover the aperture therein, said flat base having a central inwardly tapering recess extending into the interior of the rubber bumper and coaxially registering with said aperture, and a pair of discrete adjacent fastener elements having anchor portions embedded in the rubber matrix of the bumper in closely spaced juxtaposition to the plane of the base of the bumper and hook-carrying leg portions at right angles to the anchor portions and emerging freely divergingly from the recess and extending through the coaxial aperture in the rigid swingable member, the hooks on each of said fastener elements extending away from one another and the leg portions thereof being tiltably springable toward one another from a relaxed relatively divergent position, one of said fastener elements having a groove formed on its inner face adjacent the junction between its leg and anchor portion and the other fastener element having a correspondingly located complementary projection, said projection resting in the groove so as to fulcrum thereagainst under action of the restorative quality of the rubber matrix and cause the hook on each leg to engage an edge of the aperture means opposite to the edge engaged by the other hook.

References Cited in the file of this patent
UNITED STATES PATENTS

| | | |
|---|---|---|
| 1,957,778 | Hopkins | May 8, 1934 |
| 2,122,476 | Leighton | July 5, 1938 |
| 2,274,398 | Conrad | Feb. 24, 1942 |
| 2,292,554 | Weeber | Aug. 11, 1942 |
| 2,455,669 | Gagnier | Dec. 7, 1948 |
| 2,596,780 | Meyers et al. | May 13, 1952 |
| 2,607,965 | Gagnier | Aug. 26, 1952 |
| 2,625,722 | West | Jan. 20, 1953 |